United States Patent
Hong

(10) Patent No.: US 11,596,018 B2
(45) Date of Patent: Feb. 28, 2023

(54) REGION CONFIGURATION METHOD AND DEVICE

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 165 days.

(21) Appl. No.: 16/456,007

(22) Filed: Jun. 28, 2019

(65) Prior Publication Data
US 2019/0320489 A1    Oct. 17, 2019

Related U.S. Application Data

(63) Continuation of application No. PCT/CN2017/093416, filed on Jul. 18, 2017.

(30) Foreign Application Priority Data

Dec. 30, 2016 (CN) .......................... 201611258974.5

(51) Int. Cl.
*H04W 56/00* (2009.01)
*H04W 4/21* (2018.01)
(Continued)

(52) U.S. Cl.
CPC ........... *H04W 76/27* (2018.02); *H04W 4/021* (2013.01); *H04W 48/10* (2013.01); *H04W 72/005* (2013.01)

(58) Field of Classification Search
CPC ..... H04W 4/021; H04W 48/10; H04W 48/12; H04W 72/005; H04W 76/27;
(Continued)

(56) References Cited

U.S. PATENT DOCUMENTS

2016/0165627 A1  6/2016 Uemura et al.
2017/0332419 A1* 11/2017 Kim ...................... H04L 1/1887
(Continued)

FOREIGN PATENT DOCUMENTS

CN    103037937 A    4/2013
CN    103067937 A    4/2013
(Continued)

OTHER PUBLICATIONS

Extended European Search Report in European Application No. 17889164.4, dated Jul. 29, 2020.
(Continued)

*Primary Examiner* — Awet Haile
(74) *Attorney, Agent, or Firm* — Finnegan, Henderson, Farabow, Garrett & Dunner, L.L.P.

(57) ABSTRACT

A region configuration method, applied to a terminal, includes: receiving target system information that comprises a target region identification and is broadcasted or unicasted by a base station, the target region identification being a region identification of a target region; and performing target region configuration according to the target region identification, wherein the target region is a region allowing the terminal to be in a target status; the target system information is information in system information of the base station other than basic system information; and the basic system information comprises information for enabling the terminal to access the base station.

10 Claims, 9 Drawing Sheets

(51) Int. Cl.
*H04W 72/00* (2009.01)
*H04W 48/10* (2009.01)
*H04W 76/27* (2018.01)
*H04W 4/021* (2018.01)

(58) Field of Classification Search
CPC .......... H04W 36/0061; H04H 2201/00; H04H 60/00; H04H 20/38
See application file for complete search history.

(56) References Cited

U.S. PATENT DOCUMENTS

| | | | | |
|---|---|---|---|---|
| 2019/0166553 | A1* | 5/2019 | Ryoo | H04W 76/28 |
| 2019/0174480 | A1* | 6/2019 | Wong | H04L 5/0055 |
| 2019/0261447 | A1* | 8/2019 | Fujishiro | H04W 76/20 |
| 2019/0268831 | A1* | 8/2019 | Lee | H04W 48/04 |

FOREIGN PATENT DOCUMENTS

| | | |
|---|---|---|
| CN | 105898894 A | 8/2016 |
| CN | 106171011 A | 11/2016 |
| CN | 106604230 A | 4/2017 |
| EP | 3 481 107 A1 | 5/2019 |

OTHER PUBLICATIONS

International Search Report Issued in Application No. PCT/CN2017/093416, dated Sep. 28, 2017, 2 pages.
Intel Corporation, Discussion on RAN notification area for the new RRC state, 3GPP TSG RAN WG2 Meeting #96, R2-168524, Reno, USA, Nov. 14-18, 2016, 3 pages.
Kyocera, Further consideration of Modeling for Light Connection, 3GPP TSG-RAN WG2 Meeting #96, R2-168031, Reno, USA, Nov. 14-18, 2016, 5 pgs.
Intel Corporation, Light Connection signaling and UE's modeling, 3GPP TSG RAN WG2 Meeting #95bis, R2-166687, Kaohsiung, Oct. 10-14, 2016, 8 pages.
3GPP TSG-RAN2 Meeting #95bis, *Delivery of "Other SI" in NR*, Huawei, HiSilicon, Oct. 10-14, 2016, 5 pgs.
3GPP TSG-RAN WG2 Meeting #96, *Consideration on the RAN based notification in RRC_INACTIVE*, ZTE, ZTE Microelectronics, Nov. 14-18, 2016, 6 pgs.

\* cited by examiner

REGION CONFIGURATION METHOD AND DEVICE

CROSS REFERENCE TO RELATED APPLICATION

The present application is a continuation of International Application No. PCT/CN2017/093416, filed on Jul. 18, 2017, which is based on and claims the priority to Chinese Patent Application No. 201611258974.5, filed on Dec. 30, 2016, the entire contents of all of which are hereby incorporated by reference.

TECHNICAL FIELD

The present disclosure relates to the field of communications, and in particular, to a region configuration method and a region configuration device.

BACKGROUND

In related art, Radio Resource Control (RRC) supports two statuses, which are an idle status and a connected status respectively.

Current related art does not support more RRC statuses.

SUMMARY

In view of this, the present disclosure provides a region configuration method and a region configuration device to solve deficiencies in related art.

According to a first aspect of the present disclosure, there is provided a region configuration method, which is applied to a terminal and includes: receiving target system information that includes a target region identification and is broadcast or unicast by a base station, the target region identification being a region identification of a target region; and performing target region configuration according to the target region identification; wherein the target region is a region allowing the terminal to be in a target status; the target system information is information in system information of the base station other than basic system information; and the basic system information includes information for enabling the terminal to access the base station.

According to a second aspect of the present disclosure, there is provided a region configuration method, which is applied to a base station and includes: acquiring a target region identification of the target region; and broadcasting or unicasting target system information that includes the target region identification, so that a terminal that receives the target system information performs target region configuration according to the target region identification; wherein the target region is a region allowing the terminal to be in a target status; the target system information is information in system information of the base station other than basic system information; and the basic system information includes information for enabling the terminal to access the base station.

According to a third aspect of the present disclosure, there is provided a terminal, including: a processor; and a memory configured to store instructions executable by the processor; wherein the processor is configured to: receive target system information that includes a target region identification and is broadcast or unicast by a base station, the target region identification being a region identification of a target region; and perform target region configuration according to the target region identification; wherein the target region is a region allowing the terminal to be in a target status; the target system information is information in system information of the base station other than basic system information; and the basic system information includes information for enabling the terminal to access the base station.

According to a fourth aspect of the present disclosure, there is provided a base station, including: a processor; and a memory configured to store instructions executable by the processor; wherein the processor is configured to: acquire a target region identification of the target region; and broadcast or unicast target system information that includes the target region identification, so that a terminal that receives the target system information performs target region configuration according to the target region identification; wherein the target region is a region allowing the terminal to be in a target status; the target system information is information in system information of the base station other than basic system information; and the basic system information includes information for enabling the terminal to access the base station.

The technical solutions provided by the embodiments of the present disclosure may bring about the following beneficial effects.

In the embodiments of the present disclosure, the terminal may perform the target region configuration according to the target region identification when receiving the target system information that includes a target region identification and is broadcast or unicast by a base station. The target region is a region allowing the terminal to be in a target status; the target system information is information in system information of the base station other than basic system information; and the basic system information includes information for enabling the terminal to access the base station. Through the above process, the target region configuration can be performed for the terminal so that the terminal can be in the target status. Compared with the related art, the terminal can support more RRC statuses.

In the embodiments of the present disclosure, the terminal may also first receive the basic system information that includes the target region support information and is broadcast by the base station. The target region support information is configured to indicate whether the base station supports the terminal accessing the base station to perform target region configuration. After determining that the base station supports the terminal accessing the base station to perform target region configuration, the target system information that is broadcast or unicast by the base station is received by the terminal, so that the target system information is received in a targeted manner to avoid occupying excessive terminal resources.

In the embodiments of the present disclosure, the terminal may actively send an acquisition request to the base station to acquire the target system information when the target system information that includes a target region identification and is broadcast or unicast by the base station to the terminal is not received. After the base station unicasts the target system information to the terminal according to the acquisition request, the terminal performs the target region configuration according to the target region identification. Through the above process, it may be ensured that the terminal can receive the target system information.

In the embodiments of the present disclosure, the target status is a status in which the terminal does not perform an RRC connection with the base station and is allowed to receive the downlink data under a condition that the terminal does not perform status switching.

In the embodiments of the present disclosure, the base station may broadcast or unicast target system information that includes the target region identification, so that a terminal that receives the target system information performs target region configuration according to the target region identification in the target system information. The target region is a region allowing the terminal to be in a target status; the target system information is information in system information of the base station other than basic system information; and the basic system information includes information for enabling the terminal to access the base station. Through the above process, the base station can make the terminal acquire the target region identification by broadcasting or unicasting the target system information, so that the terminal performs the target region configuration according to the target region identification, thereby achieving the purpose of performing the target region configuration for the terminal.

In the embodiments of the present disclosure, the base station may first determine whether it supports the terminal accessing the base station to perform target region configuration and acquire target region support information. Further, the basic system information that includes the target region support information is broadcast. After determining that the base station supports the terminal accessing the base station to perform target region configuration according to the target region support information, the terminal may acquire the target system information that includes a target region identification and is broadcast or unicast by a base station, and perform target region configuration according to the target region identification. Through the above process, the base station may first broadcast the basic system information, so that the terminal determines whether the base station supports the terminal accessing the base station to perform target region configuration, and after determining that the base station supports the terminal accessing the base station to perform target region configuration, the terminal receives the target system information to avoid occupying excessive terminal resources.

In the embodiments of the present disclosure, according to the acquisition request sent by terminal to acquire target system information, the base station may unicast the target system information to the terminal. The base station may broadcast the target system information, after receiving acquisition requests sent by more than a preset number of terminals for acquiring target system information. Through the above process, when the terminal requests to acquire the target system information, the target system information is sent to the terminal. Further, when the terminal that requests to acquire the target system information exceeds a preset number, the target system information may be broadcast by the base station to save base station resources.

It should be understood that the above general description and the following detailed description are merely exemplary and explanatory and should not be construed as limiting of the disclosure.

BRIEF DESCRIPTION OF THE DRAWINGS

The accompanying drawings, which are incorporated in the specification and constitute a part of the specification, show exemplary embodiments of the present disclosure. The drawings along with the specification explain the principles of the present disclosure.

DETAILED DESCRIPTION

Figure 1:
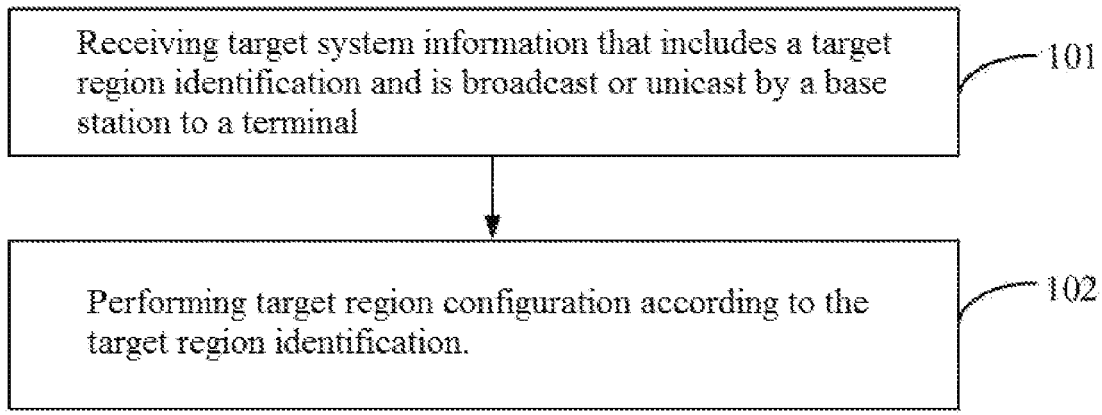
FIG. 1 is a flow chart of a region configuration method according to an exemplary embodiment.

Exemplary embodiments will be described in detail herein, examples of which are illustrated in the drawings. When the following description refers to the drawings, the same numbers in different drawings represent the same or similar elements, unless otherwise indicated. The embodiments described in the following exemplary embodiments do not represent all embodiments consistent with the present disclosure. Instead, they are merely examples of devices and methods consistent with aspects of the present disclosure as described in detail in the appended claims.

The term that is used in the present disclosure is only for the purpose of describing particular embodiments, and is not intended to limit the present disclosure. The singular forms "a", "said", and "the" used in the present disclosure and the appended claims are also intended to include plural forms unless the context clearly indicates other meanings.

It should also be understood that the term "and/or" used herein refers to and includes any or all possible combinations of one or more of the associated listed items.

It should be understood that although the terms first, second, third, etc. may be used in the present disclosure to describe various information, such information should not be limited to these terms. These terms are only used to distinguish the same type of information from one another. For example, the first information may also be referred to as the second information without departing from the scope of the present disclosure. Similarly, the second information may also be referred to as the first information. Depending on the context, the term "if" used herein may be interpreted as "upon", "when" or "in response to determination".

In the upcoming 5th generation mobile communication technology (5G) network, an RRC status is added, which is an INACTIVE status. When a terminal is in the INACTIVE status, an RRC connection will not be established between the terminal and a base station, and in the INACTIVE status, the terminal is allowed to receive the downlink data sent by the base station without performing status switching. The region allowing the terminal to be in the INACTIVE status is the target region of the embodiments of the present disclosure.

Since the terminal does not support the INACTIVE status in the related art, the target region may not be configured by the base station for the terminal.

In order to solve the above problem, the present disclosure provides a region configuration method, which can be applied to a terminal, such as a mobile phone, a tablet computer, a Personal Digital Assistant (PDA), and the like. FIG. 1 is a flow chart of a region configuration method according to an exemplary embodiment, which may include the following steps:

In step 101, target system information that includes a target region identification and is broadcast or unicast by a base station to a terminal is received.

The target region identification is a region identification of a target region. The target region is a region allowing the terminal to be in a target status; the target status is a status in which the terminal does not perform an RRC connection with the base station and is allowed to receive the downlink data under the condition that the terminal does not perform status switching.

In the embodiment of the present disclosure, the target status is an INACTIVE status, and the target region is a region that allows the terminal to be in an INACTIVE status.

In 5G, the system information of a base station can be classified into two types.

A first type of the system information is basic system information that the base station broadcasts according to a preset period and at least includes information required for the terminal to access the base station. In an embodiment, the information required for the terminal to access the base station may include information for supporting the terminal to perform cell selection, information for requesting to acquire the target system information, information for accessing the cell, and the like. That is, after receiving the basic system information sent by the base station, the terminal can access the base station.

A second type of the system information, that is, the target system information, may include the remaining information other than the basic system information in the overall system information of the base station.

In some embodiments, it may not be desirable for all terminals to receive the target region identification. If the target region identification is added to the basic system information for broadcast, terminal resources will be excessively occupied, and thus the base station adds the target region identification to the target system information and then sends to the terminal.

In this step, the terminal directly receives the target system information that is sent by the base station and includes the target region identification, e.g., according to the related art. In an embodiment, the base station may send the target system information to the terminal by means of broadcast or unicast.

In step 102, target region configuration is performed according to the target region identification.

In this step, after acquiring the target region identification, the terminal may determine the target region indicated by the target region identification. The process of configuring the target region by the terminal is to allow the terminal to be in the target status if the terminal determines that it is located in the target region. The target status is a status in which the terminal does not perform an RRC connection with the base station and is allowed to receive the downlink data under the condition that the terminal does not perform status switching.

In the above embodiment, when receiving the target system information that includes the target region identification and is broadcast or unicast by the base station, the terminal may perform the target region configuration according to the target region identification. The target region is a region allowing the terminal to be in a target status; the target system information is information in system information of the base station other than basic system information; and the basic system information includes information required for enabling the terminal to access the base station. Through the above process, the target region configuration can be performed for the terminal so that the terminal can be in the target status. Compared with the related art, the terminal can support more RRC statuses.

Figure 2:
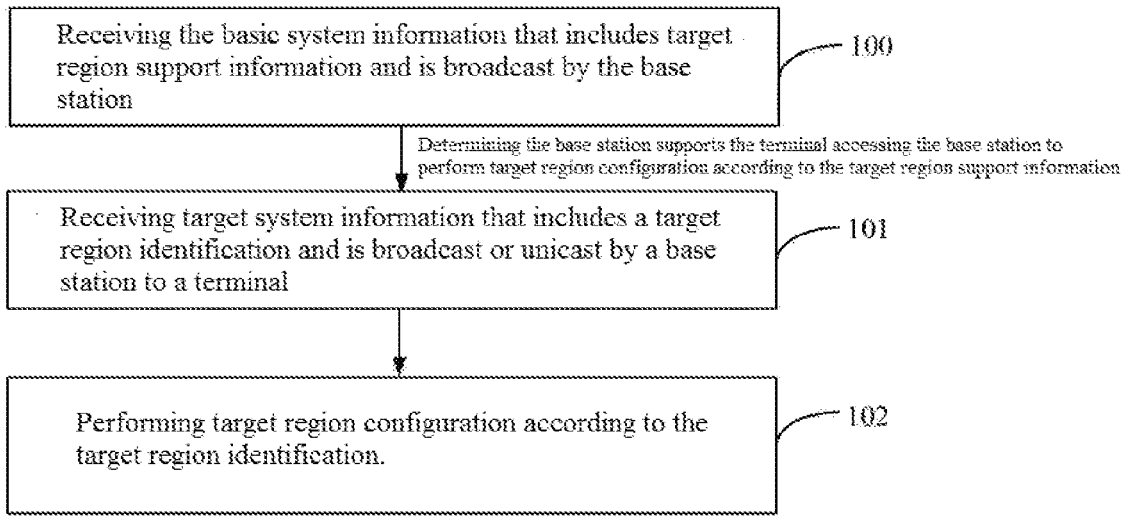
FIG. 2 is a flow chart of another region configuration method according to an exemplary embodiment.

FIG. 2 is a flow chart of another region configuration according to the embodiment shown in FIG. 1, and may further include the following step 100.

In step 100, the basic system information that includes target region support information and is broadcast by the base station is received.

The target region support information is used to indicate whether the base station supports the terminal accessing the base station to perform target region configuration.

In the embodiment of the present disclosure, since the basic system information is sent by means of broadcast, the base station may add the target region support information to the basic system information for broadcast. Therefore, the terminal that receives the basic system information may determine, according to the target region support information included in the basic system information, whether the base station supports the terminal accessing the base station to perform target region configuration, so that the terminal determines whether to receive the target region identification.

In this step, the terminal may receive the basic system information broadcast by the base station, e.g., according to the related art, thereby acquiring the target region support information therein.

After the terminal determines the base station supports the terminal accessing the base station to perform target region configuration according to the target region support information, the step 101 is performed, that is, the target system information that includes the target region identification and is broadcast or unicast by the base station to the terminal is received.

In the foregoing embodiment, the terminal may also first receive the basic system information that includes the target region support information and is broadcast by the base station. The target region support information is used to indicate whether the base station supports the terminal accessing the base station to perform target region configuration. After determining that the base station supports the terminal accessing the base station to perform target region configuration, the target system information that is broadcast or unicast by the base station to the terminal is received, so that the target system information is received in a targeted manner to avoid occupying excessive terminal resources.

Figure 3:
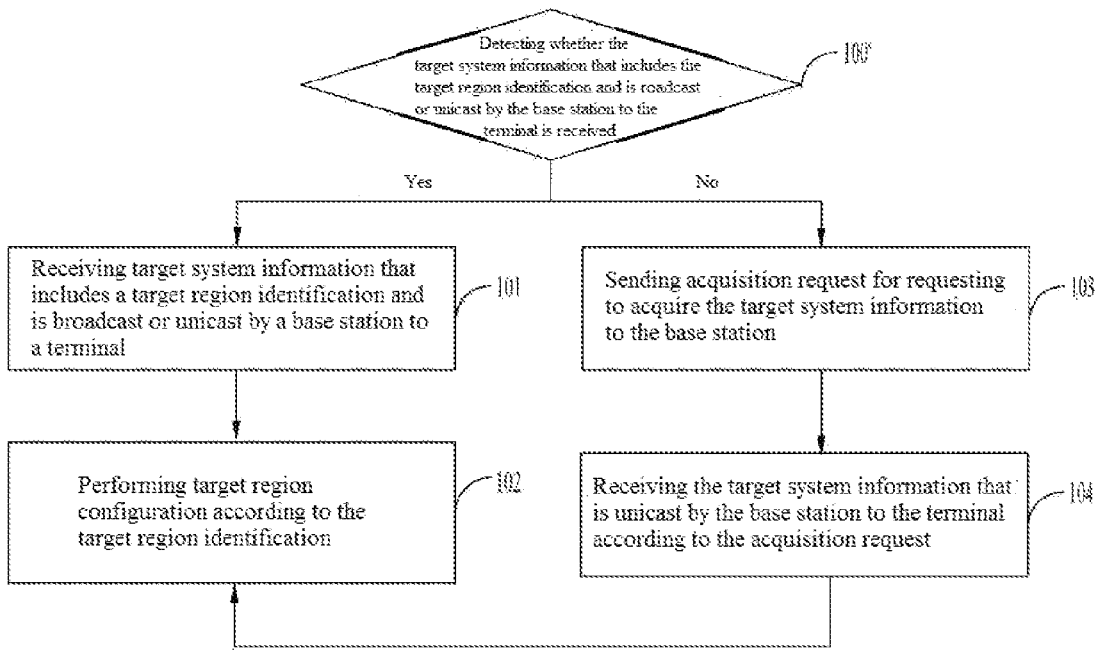
FIG. 3 is a flow chart of another region configuration method according to an exemplary embodiment.

FIG. 3 is a flow chart of another region configuration according to the embodiment shown in FIG. 1, and may further include the following steps.

In step 100', it is detected whether the target system information that includes the target region identification and is broadcast or unicast by the base station to the terminal is received.

In this step, the terminal may regularly detect whether the target system information that is broadcast or unicast by the base station and is currently accessed by the terminal is received. If the target system information is received, the above steps 101 to 102 are performed. If it is determined that the target system information is not received, then step 103 is performed.

In step 103, if it is determined that the target system information that is broadcast or unicast by the base station and is currently accessed by the terminal is not received, an acquisition request for acquiring the target system information is sent to the base station.

In this step, the terminal may actively request the base station to send the target system information, if it is determined that the terminal accessing the base station performs the target region configuration and does not currently receive the target system information that is broadcast or unicast by the base station. The acquisition request may be sent to the base station, e.g., according to the related art.

In step 104, after receiving the target system information that is unicast by the base station to the terminal according to the acquisition request, step 102 is performed.

In this step, the base station automatically, according to the acquisition request, unicasts the target system information to the terminal, e.g., based on the related art, and the terminal directly receives the target system information. After acquiring the target system information, the terminal may perform step 102 to perform target region configuration, and the process of configuring the target region is not repeated herein.

In the above embodiment, the terminal may actively send an acquisition request to the base station to acquire the target system information, if the target system information, which is broadcast or unicast by the base station and includes the target region identification of the terminal, is not received. After the base station unicasts the target system information to the terminal according to the acquisition request, the target region configuration is performed according to the target region identification. Through the above process, it may be ensured that the terminal can receive the target system information.

Figure 4:
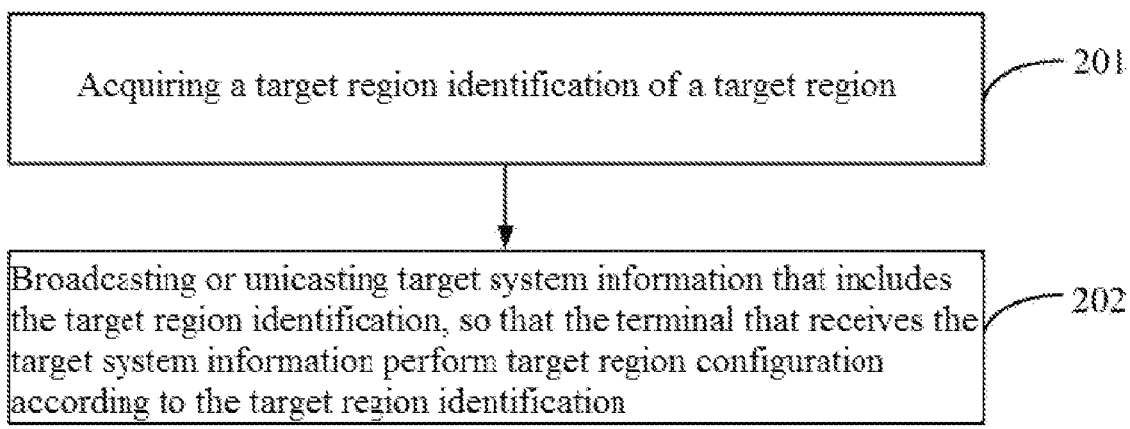
FIG. 4 is a flow chart of another region configuration method according to an exemplary embodiment.

The present disclosure also provides a region configuration method, which can be applied to a base station. FIG. 4 is a flow chart of another region configuration method according to an exemplary embodiment, and the following steps may be includes:

In step 201, a target region identification of a target region is acquired.

The target region is a region allowing the terminal to be in a target status. The target status is a status in which the terminal does not perform an RRC connection with the base station and the terminal is allowed to receive the downlink data under the condition that the terminal does not perform status switching.

In this step, the target region identification may be configured by an operator for the base station. The base station may acquire the target region identification of the target region corresponding to itself, e.g., according to the related art.

In step 202, target system information that includes the target region identification is broadcast or unicast, so that the terminal that receives the target system information performs target region configuration according to the target region identification.

In 5G, the system information of the base station can be classified into two types. The first type of system information is the basic system information broadcast by the base station according to a preset period, and at least includes information required for the terminal to access the base station. In an embodiment, the information required for the terminal to access the base station may include information for supporting the terminal to perform cell selection, information for requesting to acquire the target system information, information for accessing the cell, and the like. That is, after receiving the basic system information sent by the base station, the terminal can access the base station.

A second type of the system information, that is, the target system information, may include the remaining information other than the basic system information in the overall system information of the base station.

In the embodiment of the present disclosure, it may not be desirable for all terminals to receive the target region identification. If the target region identification is added to the basic system information for broadcast, the terminal resources will be excessively occupied, and thus the target region identification can be added to the target system information.

In this step, the base station may broadcast or unicast target system information that includes the target region identification, e.g., according to the related art. After receiving the target system information, the terminal acquires the target region identification therein, so that the target region configuration is performed according to the target region identification.

In the foregoing embodiment, the base station may broadcast or unicast target system information that includes the target region identification, so that the terminal that receives the target system information performs target region configuration according to the target region identification in the target system information. The target region is a region allowing the terminal to be in a target status; the target system information is information in system information of the base station other than basic system information; and the basic system information at least includes information required for enabling the terminal to access the base station. Through the above process, the base station can make the terminal acquire the target region identification by broadcasting or unicasting the target system information, so that the terminal performs the target region configuration for itself according to the target region identification, thereby achieving the purpose of performing the target region configuration for the terminal.

Figure 5:
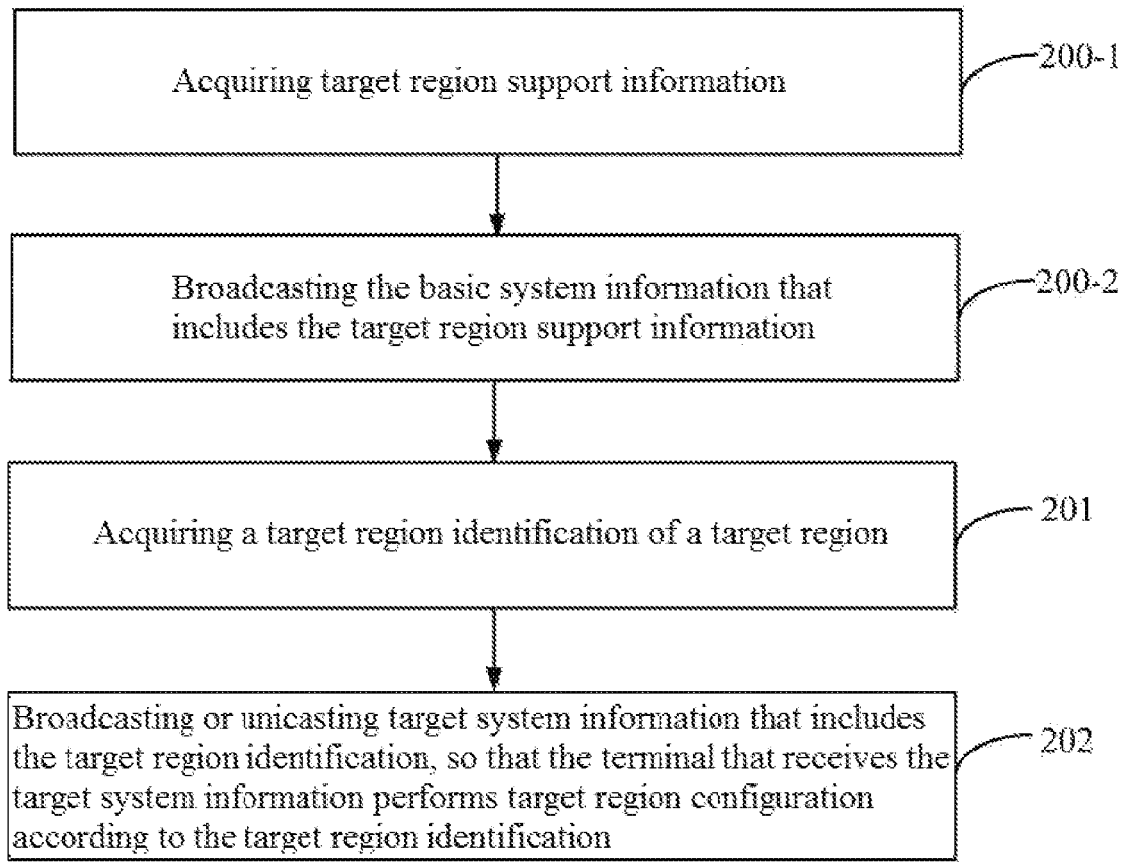
FIG. 5 is a flow chart of another region configuration method according to an exemplary embodiment.

FIG. 5 is a flow chart of another region configuration according embodiment shown in FIG. 4, and may further include the following steps.

In step 200-1, target region support information is acquired.

The target region support information is used to indicate whether the base station supports the terminal accessing the base station to perform target region configuration.

In this step, the base station may first determine whether it supports the terminal accessing the base station to perform target region configuration. The target region support information is configured by an operator, and the base station may acquire the target region support information according to the related arts.

In step 200-2, the basic system information that includes the target region support information is broadcast, so that after the terminal that receives the basic system information determines that the base station supports the terminal accessing the base station to perform target region configuration according to the target region support information, the target system information that includes the target region identification and is broadcast or unicast by the base station to the terminal is acquired and the target region configuration is performed according to the target region identification.

In this step, the basic system information is usually transmitted by means of broadcast; therefore, the target region support information can be added to the basic system information for broadcast. After receiving the basic system information, the terminal may determine the base station supports the terminal accessing the base station to perform target region configuration according to the target region support information therein, and then the target system information that includes the target region identification and is broadcast or unicast by the base station to the terminal is acquired and the target region configuration is performed according to the target region identification.

In the above embodiment, the base station may first determine whether it supports the terminal accessing the base station to perform target region configuration and acquire target region support information. Further, the basic system information that includes the target region support information is broadcast. After determining that the base station supports the terminal accessing the base station to perform target region configuration according to the target region support information, the terminal may acquire the target system information that includes a target region identification and is broadcast or unicast by a base station to a terminal, and perform target region configuration according to the target region identification. Through the above process, the base station may first broadcast the basic system information, so that the terminal determines whether the base station supports the terminal accessing the base station to perform target region configuration, and after determining that the base station supports the terminal accessing the base station to perform target region configuration, the terminal receive the target system information to avoid occupying excessive terminal resources.

Figure 6:
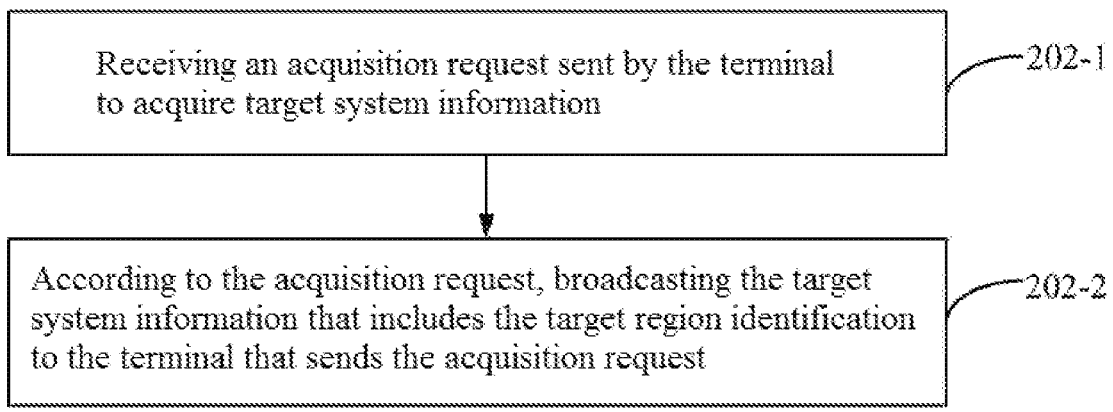
FIG. 6 is a flow chart of another region configuration method according to an exemplary embodiment.

FIG. 6 is a flow chart of another region configuration according to the embodiment shown in FIG. 4, and step 202 may include the following steps:

In step an acquisition request sent by the terminal to acquire target system information is received.

In this step, the base station may receive the acquisition request sent by the terminal, e.g., according to the related art.

In step 202-2, according to the acquisition request, the target system information that includes the target region identification is unicast to the terminal that sends the acquisition request.

In this step, after receiving the acquisition request, the base station directly unicasts the target system information to the terminal that requests to acquire the target system information.

In the foregoing embodiment, the base station may unicast the target system information to the terminal according to the acquisition request sent by the terminal, so that the terminal performs the target region configuration according to the target region identification in the target system information. Through the above process, the target system information is unicast to the terminal requesting to acquire the target system information, and it may be ensured that the terminal can perform the target region configuration according to the target system information.

In an embodiment, step 202 may include: the target system information that includes the target region identification is broadcast, after the acquisition requests for acquiring target system information sent by more than a preset number of terminals are received.

In this step, if the base station receives the acquisition requests sent by more than a preset number of terminals in the same time period, and if the base station unicasts the target system information to all of the terminals that send the acquisition request, the base station resources are occupied excessively. In the embodiment of the present disclosure, the base station may send the target system information by means of broadcast. The terminal that receives the target system information can perform the target region configuration according to the target region identification therein.

In the foregoing embodiment, after receiving the acquisition request sent by more than a preset number of terminals, the base station may broadcast the target system information, thereby saving the base station resource.

Figure 7:
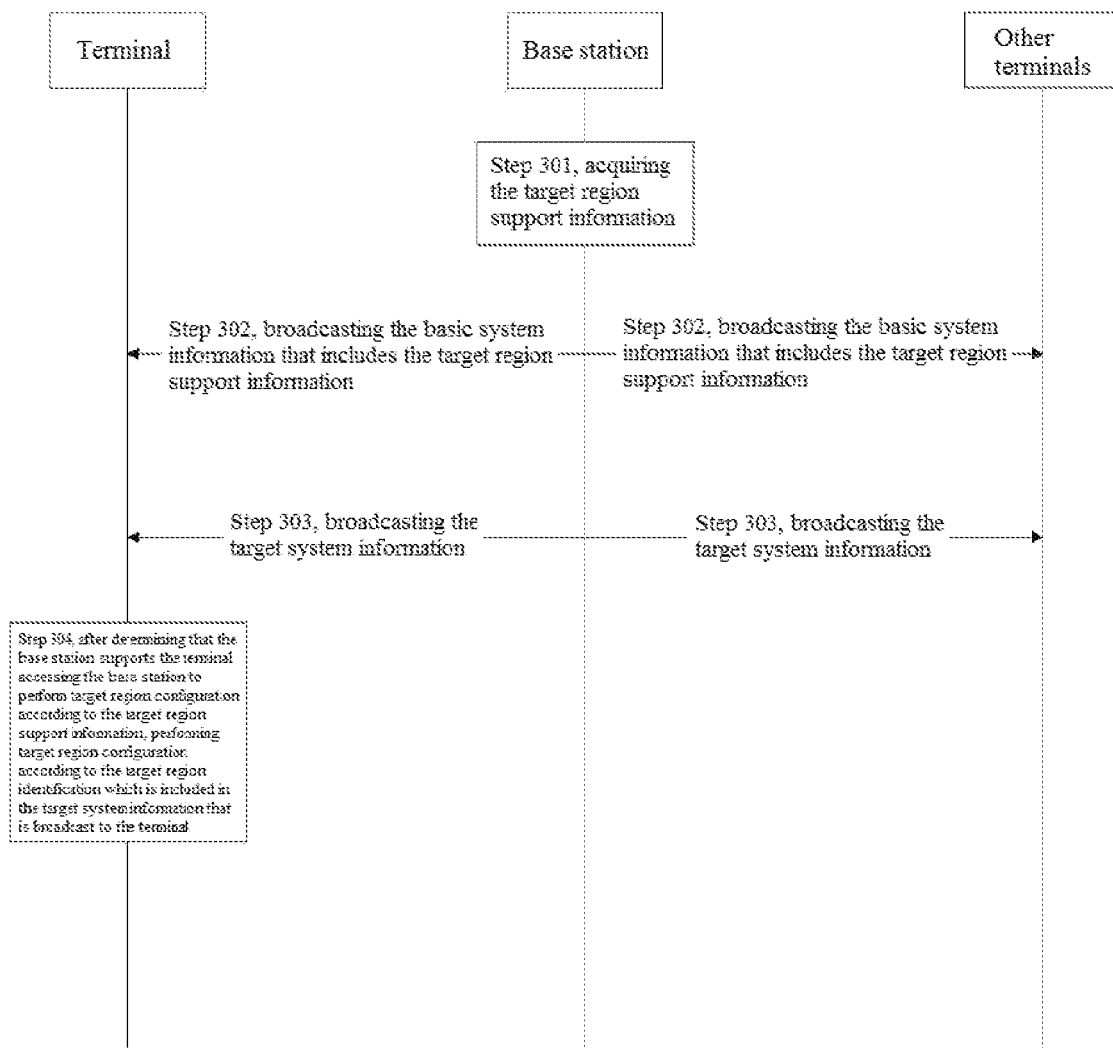
FIG. 7 is a flow chart of another region configuration method according to an exemplary embodiment.

FIG. 7 is a flow chart of another region configuration method according to an exemplary embodiment, and the method may include the following steps.

In step 301, the base station acquires the target region support information.

The target region support information is used to indicate whether the base station supports the terminal accessing the base station to perform target region configuration.

In step 302, the base station broadcasts the basic system information that includes the target region support information.

In step 303, the base station broadcasts the target system information.

In this step, if the base station supports the terminal accessing the base station to perform the target region configuration, the target system information broadcast by the base station includes the target region identification. The base station may acquire the target region identification of the target region; wherein, the target region is a region allowing the terminal to be in a target status, and the target status is a status in which the terminal does not perform an RRC connection with the base station and is allowed to receive the downlink data under the condition that the terminal does not perform status switching.

In step 304, after determining that the base station supports the terminal accessing the base station to perform target region configuration according to the target region support information, the terminal performs target region configuration according to the target region identification which is included in the target system information that is broadcast to the terminal.

In the above embodiment, the base station adds the target region support information and the target region identification to the basic system information and the target system information, respectively, and broadcasts the basic system information and the target system information. After determining that the base station supports the terminal accessing the base station to perform target region configuration according to the target region support information in the received basic system information, the terminal performs target region configuration according to the target region identification, which achieves the purpose of configuring the target region for the terminal.

Figure 8:
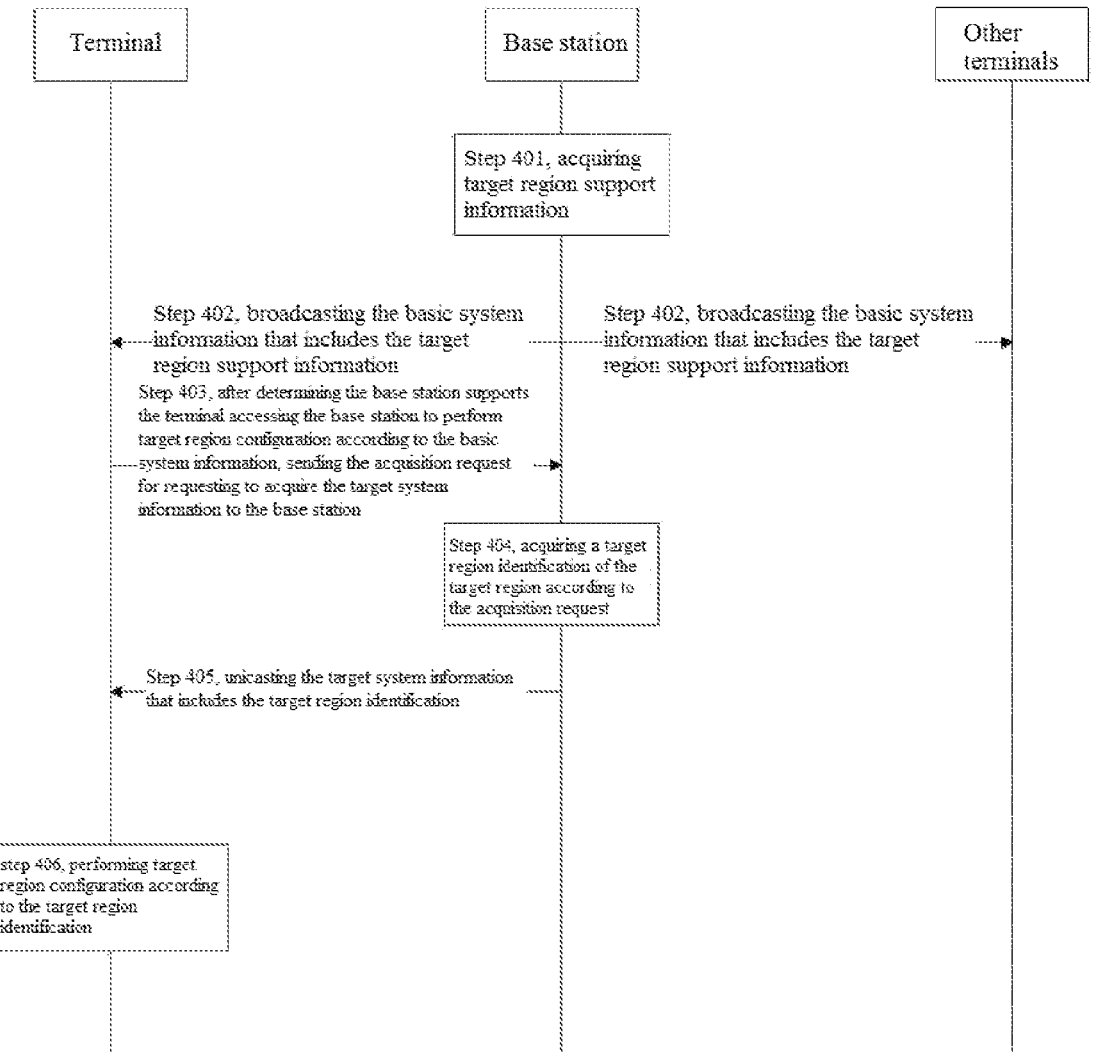
FIG. 8 is a flow chart of another region configuration method according to an exemplary embodiment.

FIG. 8 is a flow chart of another region configuration method according to an exemplary embodiment, and the method includes the following steps.

In step 401, the base station acquires target region support information.

The target region support information is used to indicate whether the base station supports the terminal accessing the base station to perform target region configuration.

In step 402, the base station broadcasts the basic system information that includes the target region support information.

In step 403, after determining the base station supports the terminal accessing the base station to perform target region configuration according to the basic system information, the terminal sends the acquisition request for acquiring the target system information to the base station.

In step 404, the base station acquires a target region identification of the target region according to the acquisition request.

The target region is a region allowing the terminal to be in a target status. The base station may acquire the target region identification, when determining that the base station supports the terminal accessing the base station to perform target region configuration.

In step 405, the base station unicasts the target system information that includes the target region identification to the terminal.

In step 406, the terminal performs target region configuration according to the target region identification.

In the above embodiment, the base station adds the target region support information to the basic system information for broadcast. After receiving the acquisition request sent by the terminal, the base station unicasts the target system information that includes the target region identification to the terminal. The target region configuration is performed by the terminal according to the target region identification in the received target system information. Through the above process, the target region configuration can also be performed for the terminal, and occupying the excessive base station and terminal resources is avoided.

In the foregoing embodiment shown in FIG. 8, if the base station receives the acquisition request sent by more than a preset number of terminals, the base station ay broadcast the target system information. The terminal that receives the target system information subsequently performs target region configuration according to the target region identification included in the target system information, avoiding occupying the excessive base station and terminal resources.

The foregoing method embodiments are described as a series of operations, but those skilled in the art will understand that the present disclosure is not limited by the described operation sequence, and steps may be performed in other orders or concurrently.

Corresponding to the foregoing method embodiments, the present disclosure also provides device embodiments, as described below.

Figure 9:
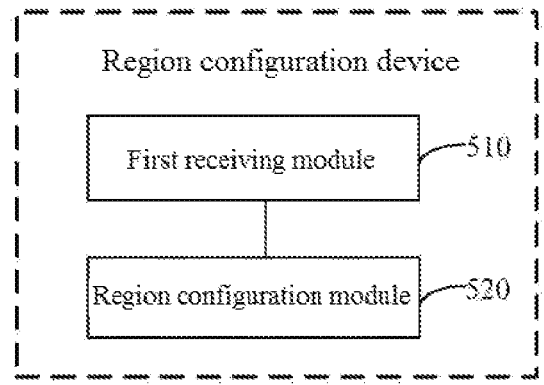
FIG. 9 is a block diagram of a region configuration device according to an exemplary embodiment.

FIG. 9 is a block diagram of a region configuration device according to an exemplary embodiment. The device includes: a first receiving module 510 configured to receive target system information that includes a target region identification and is broadcast or unicast by a base station to a terminal, the target region identification being a region identification of a target region; and a region configuration module 520 configured to perform target region configuration according to the target region identification.

The target region is a region allowing the terminal to be in a target status; the target system information is information in system information of the base station other than basic system information; and the basic system information at least includes information required for enabling the terminal to access the base station.

Figure 10:
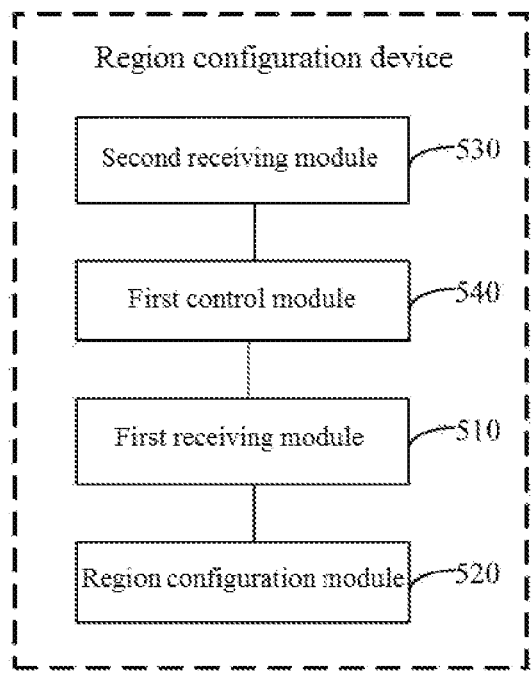
FIG. 10 is a block diagram of another region configuration device according to an exemplary embodiment.

FIG. 10 is a block diagram of a region configuration device based on the embodiment shown in FIG. 9, according to an exemplary embodiment. The device further includes: a second receiving module 530 configured to receive the basic system information that includes target region support information and is broadcast by the base station, and the target region support information being used to indicate whether the base station supports the terminal accessing the base station to perform target region configuration; and a first control module 540 configured to, after determining that the base station supports the terminal accessing the base station to perform target region configuration according to the target region support information, control the first receiving module to receive the target system information that includes the target region identification and is broadcast or unicast by the base station to the terminal.

Figure 11:
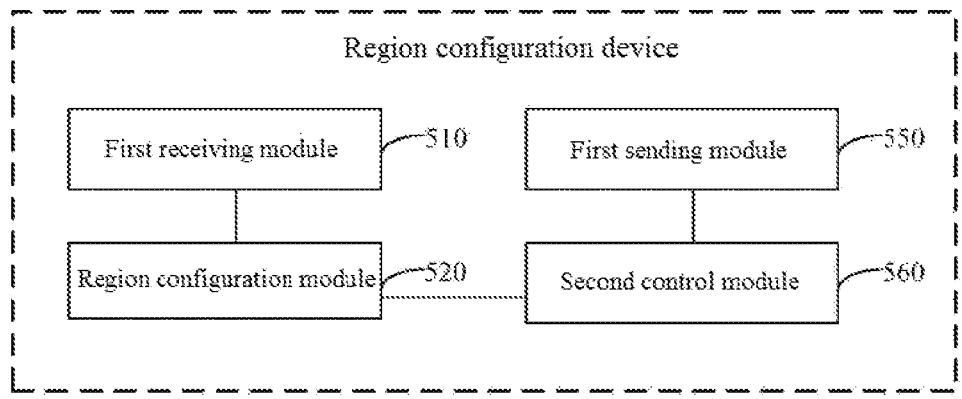
FIG. 11 is a block diagram of another region configuration device according to an exemplary embodiment.

FIG. 11 is a block diagram of a region configuration device based on the embodiment shown in FIG. 9, according to an exemplary embodiment. The device further includes: a first sending module 550 configured to send an acquisition request for acquiring the target system information to the base station if it is determined that the target system information that includes a target region identification and is broadcast or unicast by the base station to the terminal is not received; and a second control module 560 configured to, after receiving the target system information that is unicast by the base station to the terminal according to the acquisition request, control the region configuration module to perform the target region configuration according to the target region identification.

In art embodiment, the target status is a status in which the terminal does not perform art RRC connection with the base station and is allowed to receive the downlink data under the condition that the terminal does not perform status switching.

Figure 12:
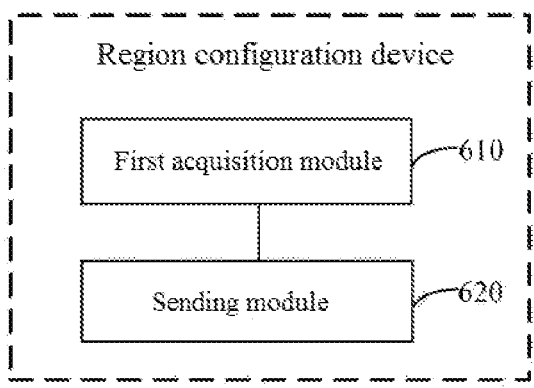
FIG. 12 is a block diagram of another region configuration device according to an exemplary embodiment.

FIG. 12 is a block diagram of a region configuration device according to an exemplary embodiment. The device may be disposed at a base station and includes: a first acquisition module 610 configured to acquire a target region identification of the target region; and a sending module 620 configured to broadcast or unicast target system information that includes the target region identification, so that a terminal that receives the target system information performs target region configuration according to the target region identification. The target region is a region allowing the terminal to be in a target status; the target system information is information in system information of the base station other than basic system information; and the basic system information at least includes information required for enabling the terminal to access the base station.

Figure 13:
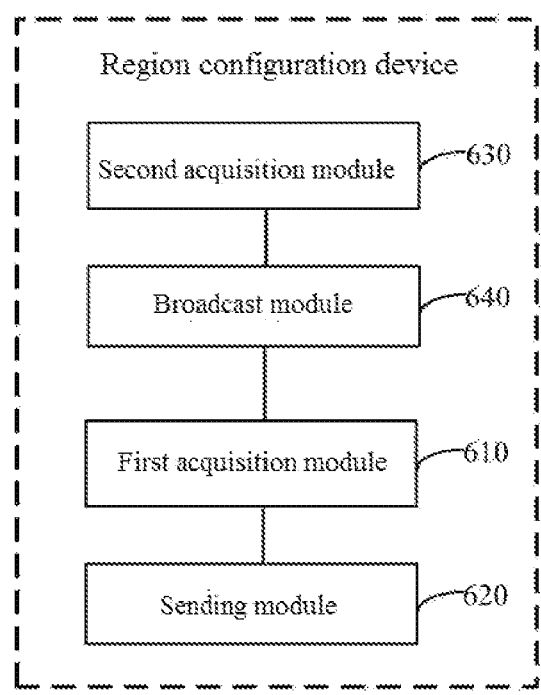
FIG. 13 is a block diagram of another region configuration device according to an exemplary embodiment.

FIG. 13 is a block diagram of a region configuration device based on the embodiment shown in FIG. 12, according to an exemplary embodiment. The device further includes: a second acquisition module 630 configured to acquire target region support information, and the target region support information is configured to indicate whether the base station supports the terminal accessing the base station to perform target region configuration; and a broadcast module 640 configured to broadcast the basic system information that includes the target region support information, so that after the terminal that receives the basic system information determines that the base station supports the terminal accessing the base station to perform target region configuration according to the target region support information, the target system information that includes the target region identification and is broadcast or unicast by the base station to the terminal is acquired and target region configuration is performed according to the target region identification.

Figure 14:
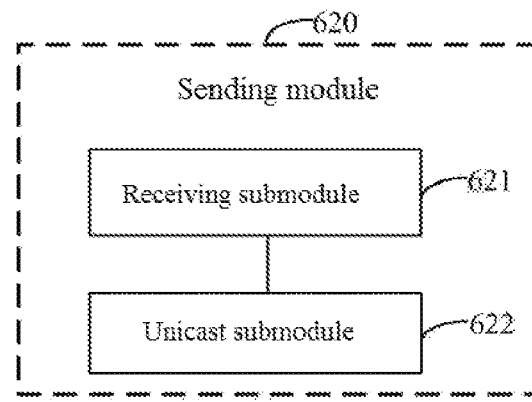
FIG. 14 is a block diagram of another region configuration device according to an exemplary embodiment.

FIG. 14 is a block diagram of a region configuration device based on the embodiment shown in FIG. 12, according to an exemplary embodiment. In the embodiment, the sending module 620 includes: a receiving submodule 621 configured to receive an acquisition request sent by the terminal to acquire target system information; and a unicast submodule 622 configured to unicast the target system information that includes the target region identification to the terminal that sends the acquisition request, according to the acquisition request.

Figure 15:
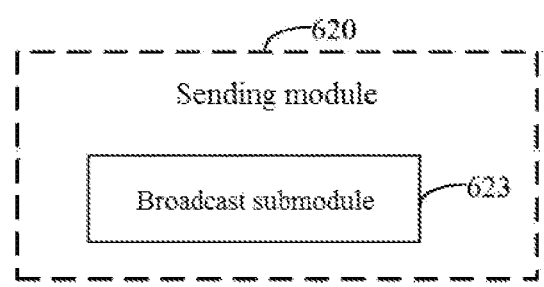
FIG. 15 is a block diagram of another region configuration device according to an exemplary embodiment.

FIG. 15 is a block diagram of a region configuration device based on the embodiment shown in FIG. 12, according to an exemplary embodiment. In the embodiment, the sending module 620 includes: a broadcast submodule 623 configured to, after receiving the acquisition requests for acquiring target system information sent by more than a preset number of terminals, broadcast target system information that includes the target region identification.

In an embodiment, the target status is a status in which the terminal does not perform an RRC connection with the base station and is allowed to receive the downlink data under the condition that the terminal does not perform status switching.

With regard to the device embodiments, the specific manner in which the respective modules perform the operations has been described in detail in the method embodiments, and will not be described in detail herein.

Correspondingly, an embodiment of the present disclosure further provides a region configuration device, including: a processor; and a memory configured to store instructions which is executable by the processor; wherein the processor is configured to: receive target system information that includes a target region identification and is broadcast or unicast by a base station to a terminal, the target region identification being a region identification of a target region; and perform target region configuration according to the target region identification; wherein the target region is a region allowing the terminal to be in a target status; the target system information is information in system information of the base station other than basic system information; and the basic system information includes information required for enabling the terminal to access the base station.

Figure 16:
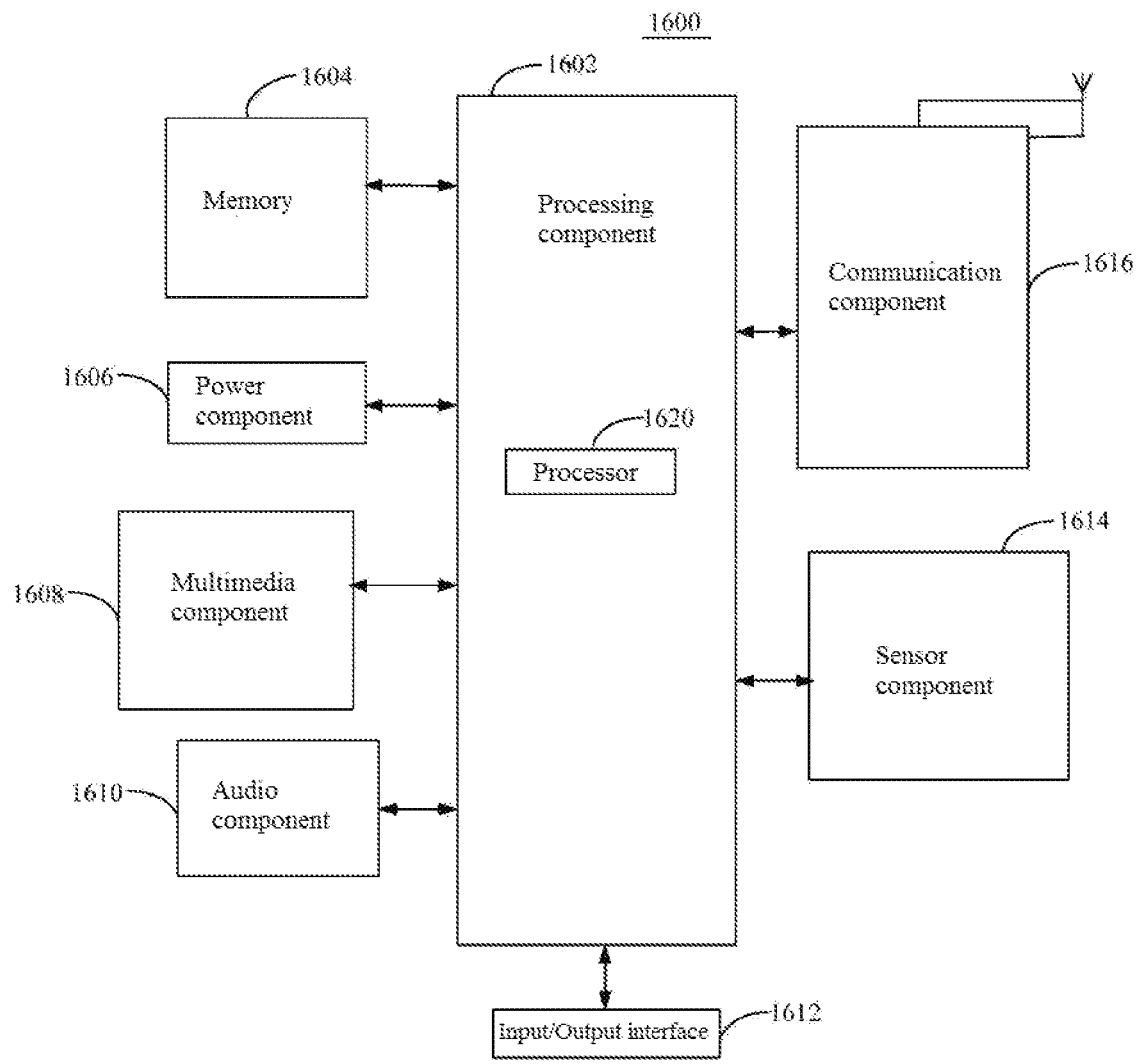
FIG. 16 is a schematic diagram of a region configuration device according to an exemplary embodiment.

FIG. 16 is a schematic diagram of a device 1600 for region configuration according to an exemplary embodiment. For example, the device 1600 may be a terminal, such as a mobile phone, a computer, a digital broadcast terminal, a message transceiver, a gaming console, a tablet device, a medical device, a fitness device, a personal digital assistant, and a wearable device (such as a smart watch, smart glasses, smart bracelets, smart running shoes, etc.).

Referring to FIG. 16, the device 1600 may include one or more of the following components: a processing component 1602, a memory 1604, a power component 1606, a multimedia component 1608, an audio component 1610, an input/output (110) interface 1612, a sensor component 1614, and a communication component 1616.

The processing component 1602 typically controls the overall operations of the device 1600, such as the operations associated with display, telephone calls, data communications, camera operations, and recording operations. The processing component 1602 can include one or more processors 1620 to execute instructions to perform all or part of the steps in the above described methods. Moreover, the processing component 1602 can include one or more modules to facilitate the interaction between the processing component 1602 and other components. For example, the processing component 1602 can include a multimedia module to facilitate the interaction between the multimedia component 1608 and the processing component 1602.

The memory 1604 is configured to store various types of data to support the operation of the device 1600. Examples of such data include instructions for any application or method operated on device 1600, such as the contact data, the phone book data, messages, pictures, videos, and the like. The memory 1604 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1606 provides power to various components of the device 1600. The power component 1606 can include a power management system, one or more power sources, and other components associated with the generation, management, and distribution of power in the device 1600.

The multimedia component 1608 includes a screen providing an output interface between the device 1600 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not sense a boundary of a touch or swipe action, but also sense the duration and pressure associated with the touch or swipe action. In some embodiments, the multimedia component 1608 includes a front camera and/or a rear camera. When the device 1600 is in an operation mode, such as a photographing mode or a video mode, the front camera and/or the rear camera can receive external multimedia datum. Each of the front camera and the rear camera may be a fixed optical lens system or have focus and optical zoom capability.

The audio component 1610 is configured to output and/or input an audio signal. For example, the audio component 1610 includes a microphone (MIC) configured to receive an external audio signal when the device 1600 is in an operation mode, such as a call mode, a recording mode, and a voice recognition mode. The received audio signal may be further stored in the memory 1604 or transmitted via the communication component 1616. In some embodiments, the audio component 1610 also includes a speaker for outputting the audio signal.

The I/O interface 1612 provides an interface between the processing component 1602 and peripheral interface modules, such as a keyboard, a click wheel, buttons, and the like. These buttons may include, but are not limited to, a home button, a volume button, a starting button, and a locking button.

The sensor component 1614 includes one or more sensors for providing status assessments of various aspects of the device 1600. For example, the sensor component 1614 can detect an on/off status of the device 1600, relative positioning of components, such as the display and the keypad of the device 1600. The sensor component 1614 can also detect a change in position of the device 1600 or a component of the device 1600, the presence or absence of user contact with the device 1600, an orientation, or an acceleration/deceleration of the device 1600, and a change in temperature of the device 1600. The sensor component 1614 can include a proximity sensor configured to detect the presence of nearby objects without any physical contact. The sensor component 1614 can also include a light sensor, such as a CMOS or CCD image sensor, configured to use in imaging applications. In some embodiments, the sensor component 1614 can also include an accelerometer sensor, a gyroscope sensor, a magnetic sensor, a pressure sensor, or a temperature sensor.

The communication component 1616 is configured to facilitate wired or wireless communication between the device 1600 and other devices. The device 1600 can access a wireless network based on a communication standard, such as WiFi, 4G or 5G, or a combination thereof. In an exemplary embodiment, the communication component 1616 receives broadcast signals or broadcast associated information from an external broadcast management system via a broadcast channel. In an exemplary embodiment, the communication component 1616 also includes a near field communication (NFC) module to facilitate short-range communications. In some embodiments, the communication component 1616 may be implemented based on a radio frequency identification (RFID) technology, an infrared data association (IrDA) technology, an ultra-wideband (UWB) technology, a Bluetooth (BT) technology, and other technologies In an exemplary embodiment, the device 1600 may be implemented with one or more application specific integrated circuits (ASICs), digital signal processors (DSPs), digital signal processing devices (DSPDs), programmable logic devices (PLDs), field programmable Gate array (FPGA), controller, microcontroller, microprocessor or other electronic components.

In an exemplary embodiment, there is also provided a non-transitory computer-readable storage medium including instructions, such as the instructions included in the memory 1604, executable by the processor 1620 of the device 1600, to perform the above described methods. For example, the non-transitory computer readable storage medium may be a ROM, a random access memory (RAM), a CD-ROM, a magnetic tape, a floppy disc, and an optical data storage device, etc.

The present disclosure further provides a region configuration device, including: a processor; and a memory configured to store instructions which is executable by the processor; wherein the processor is configured to: acquire a target region identification of the target region; and broadcast or unicast target system information that includes the target region identification, so that a terminal that receives the target system information performs target region configuration according to the target region identification.

The target region is a region allowing the terminal to be in a target status; the target system information is information in system information of the base station other than basic system information; and the basic system information at least includes information required for enabling the terminal to access the base station.

Figure 17:
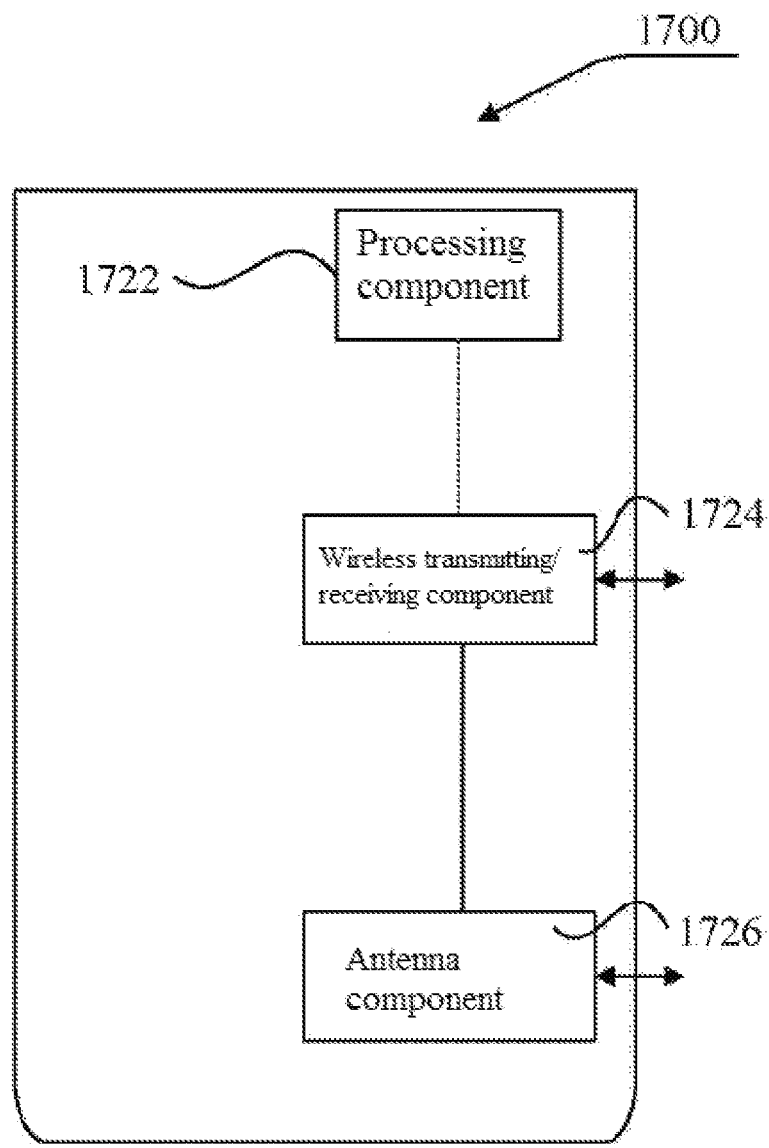
FIG. 17 is a schematic diagram of another region configuration device according to an exemplary embodiment.

FIG. 17 is a schematic diagram of a device 1700 for region configuration according to an exemplary embodiment. The device 1700 may be provided as a base station. Referring to FIG. 17, the device 1700 includes a processing component 1722, a wireless transmitting/receiving component 1724, an antenna component 1726, and a signal processing portion specific to a wireless interface. The processing component 1722 can further include one or more processors.

One of the processors in the processing components 1722 can be configured to: acquire a target region identification of the target region; and broadcast or unicast target system information that includes the target region identification, so that a terminal that receives the target system information performs target region configuration according to the target region identification; wherein the target region is a region allowing the terminal to be in a target status; the target system information is information in system information of the base station other than basic system information; and the basic system information at least includes information required for enabling the terminal to access the base station.

Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

The above description is only the preferred embodiments of the present disclosure, and is not intended to limit the present disclosure. And any modifications, equivalents, improvements, etc., within the spirit and principles of the present disclosure should be included within the protection scope of the present disclosure.

What is claimed is:

1. A region configuration method, applied to a terminal, comprising:

receiving basic system information that comprises target region support information and is broadcast by a base station, the target region support information being configured to indicate whether the base station supports the terminal accessing the base station to perform target region configuration;

in response to determining, according to the target region support information, that the base station supports the terminal accessing the base station to perform the target region configuration, receiving target system information that comprises a target region identification and is broadcast or unicast by the base station, the target region identification being a region identification of a target region; and performing the target region configuration according to the target region identification;

wherein the target region is a region allowing the terminal to be in a target status; the target system information is information in system information of the base station other than the basic system information; and the basic system information comprises information for enabling the terminal to access the base station;

wherein the target status is a status in which the terminal does not perform a radio resource control connection with the base station and is allowed to receive downlink data under a condition that the terminal does not perform status switching;

wherein performing the target region configuration is to allow the terminal to be in the target status when the terminal determines that itself is located in the target region; and in response to determining, according to the target region support information, that the base station does not support the terminal accessing the base station to perform the target region configuration, not receiving the target system information.

2. The method according to claim 1, further comprising:
sending an acquisition request for acquiring the target system information to the base station, when determining that the target system information that comprises the target region identification and is broadcast or unicast by the base station is not received; and
after receiving the target system information that is unicast by the base station to the terminal according to the acquisition request, performing the performing the target region configuration according to the target region identification.

3. A region configuration method, applied to a base station, comprising:
acquiring target region support information, the target region support information being configured to indicate whether the base station supports a terminal accessing the base station to perform target region configuration;
broadcasting basic system information that comprises the target region support information;
acquiring a target region identification of a target region; and
broadcasting or unicasting target system information that comprises the target region identification, so that when the terminal that receives the basic system information determines that the base station supports the terminal accessing the base station to perform the target region configuration according to the target region support information, the terminal that receives the target system information performs the target region configuration according to the target region identification, and when the terminal that receives the basic system information determines that the base station does not support the terminal accessing the base station to perform the target region configuration according to the target region support information, the terminal does not receive the target system information;
wherein the target region is a region allowing the terminal to be in a target status; the target system information is information in system information of the base station other than the basic system information; and the basic system information comprises information for enabling the terminal to access the base station;
wherein the target status is a status in which the terminal does not perform a radio resource control connection with the base station and is allowed to receive downlink data under a condition that the terminal does not perform status switching;
wherein performing the target region configuration is to allow the terminal to be in the target status when the terminal determines that itself is located in the target region.

4. The method according to claim 3, wherein unicasting target system information that comprises the target region identification comprises:
receiving an acquisition request sent by the terminal to acquire the target system information; and
according to the acquisition request, unicasting the target system information that comprises the target region identification to the terminal that sends the acquisition request.

5. The method according to claim 3, wherein broadcasting target system information that comprises the target region identification comprises:
after receiving acquisition requests for acquiring target system information sent by more than a preset number of terminals, broadcasting the target system information that comprises the target region identification.

6. A terminal, comprising:
a processor; and
a memory storing instructions executable by the processor;
wherein the processor is configured to:
receive basic system information that comprises target region support information and is broadcast by a base station, the target region support information being configured to indicate whether the base station supports a terminal accessing the base station to perform target region configuration;
in response to determining, according to the target region support information, that the base station supports the terminal accessing the base station to perform the target region configuration,
receive target system information that comprises a target region identification and is broadcast or unicast by the base station, the target region identification being a region identification of a target region; and
perform the target region configuration according to the target region identification;
wherein the target region is a region allowing the terminal to be in a target status; the target system information is information in system information of the base station other than the basic system information; and the basic system information comprises information for enabling the terminal to access the base station;
wherein the target status is a status in which the terminal does not perform a radio resource control connection with the base station and is allowed to receive downlink data under a condition that the terminal does not perform status switching;
wherein performing the target region configuration is to allow the terminal to be in the target status when the terminal determines that itself is located in the target region; and
in response to determining, according to the target region support information, that the base station does not support the terminal accessing the base station to perform the target region configuration, not receive the target system information.

7. The terminal according to claim 6, wherein the processor is further configured to:
send an acquisition request for acquiring the target system information to the base station when determining that the target system information that comprises the target region identification and is broadcast or unicast by the base station is not received; and
after receiving the target system information that is unicast by the base station to the terminal according to the acquisition request, perform the target region configuration according to the target region identification.

8. A base station, comprising:
a processor; and
a memory storing instructions executable by the processor;
wherein the processor is configured to:
acquire target region support information, the target region support information being configured to indicate whether the base station supports a terminal accessing the base station to perform target region configuration;

broadcast basic system information that comprises the target region support information;

acquire a target region identification of a target region; and broadcast or unicast target system information that comprises the target region identification, so that when the terminal that receives the basic system information determines that the base station supports the terminal accessing the base station to perform the target region configuration according to the target region support information, the terminal that receives the target system information performs the target region configuration according to the target region identification, and when the terminal that receives the basic system information determines that the base station does not support the terminal accessing the base station to perform the target region configuration according to the target region support information, the terminal does not receive the target system information;

wherein the target region is a region allowing the terminal to be in a target status; the target system information is information in system information of the base station other than the basic system information; and the basic system information comprises information for enabling the terminal to access the base station;

wherein the target status is a status in which the terminal does not perform a radio resource control connection with the base station and is allowed to receive downlink data under a condition that the terminal does not perform status switching;

wherein performing the target region configuration is to allow the terminal to be in the target status when the terminal determines that itself is located in the target region.

9. The base station according to claim 8, wherein the processor is further configured to:

receive an acquisition request sent by the terminal to acquire the target system information; and according to the acquisition request, unicast the target system information that comprises the target region identification to the terminal that sends the acquisition request.

10. The base station according to claim 8, wherein the processor is further configured to:

after receiving acquisition requests for acquiring target system information sent by more than a preset number of terminals, broadcast the target system information that comprises the target region identification.

* * * * *